(12) United States Patent
Marceau et al.

(10) Patent No.: US 7,711,622 B2
(45) Date of Patent: May 4, 2010

(54) FINANCIAL STATEMENT AND TRANSACTION IMAGE DELIVERY AND ACCESS SYSTEM

(76) Inventors: Stephen M Marceau, 215 Tomahawk, San Antonio, TX (US) 78232; Randolph C Marceau, 115 W. Fair Oaks Pl., San Antonio, TX (US) 78209; Daniel Victor Smith, 2210 Bedford Stage, San Antonio, TX (US) 78213; Damon Leigh Herrin, 702 Patricia, San Antonio, TX (US) 78216; Rebecca Joy Baker, 204 Caladium Dr., Castle Hills, TX (US) 78213; Hector Osvaldo Carrillo, 1522 Townsend House Dr., San Antonio, TX (US) 78251

( * ) Notice: Subject to any disclaimer, the term of this patent is extended or adjusted under 35 U.S.C. 154(b) by 33 days.

(21) Appl. No.: 12/042,855

(22) Filed: Mar. 5, 2008

(65) Prior Publication Data

US 2009/0228382 A1 Sep. 10, 2009

(51) Int. Cl.
*G06Q 40/00* (2006.01)
(52) U.S. Cl. .................................................. 705/35
(58) Field of Classification Search ................ 382/305, 382/100, 137; 704/9; 705/1–45; 706/55; 707/102, 1–3; 709/206; 715/270
See application file for complete search history.

(56) References Cited

U.S. PATENT DOCUMENTS

| | | | |
|---|---|---|---|
| 4,815,029 A | 3/1989 | Barker et al. | |
| 4,955,056 A | 9/1990 | Stentiford | |
| 5,201,046 A | 4/1993 | Goldberg et al. | |
| 5,222,234 A | 6/1993 | Wang et al. | |
| 5,251,294 A | 10/1993 | Abelow | |
| 5,297,249 A | 3/1994 | Bernstein et al. | |
| 5,367,621 A | 11/1994 | Cohen et al. | |
| 5,446,891 A | 8/1995 | Kaplan et al. | |
| 5,455,945 A | 10/1995 | VanderDrift | |
| 5,519,865 A | 5/1996 | Kondo et al. | |
| 5,535,382 A | 7/1996 | Ogawa | |
| 5,537,586 A | 7/1996 | Amram et al. | |
| 5,544,352 A | 8/1996 | Egger | |
| 5,557,722 A | 9/1996 | DeRose et al. | |
| 5,649,186 A | 7/1997 | Ferguson | |
| 5,652,880 A | 7/1997 | Seagraves | |
| 5,659,742 A | 8/1997 | Beattie et al. | |
| 5,675,769 A | 10/1997 | Ruff et al. | |
| 5,678,041 A | 10/1997 | Baker et al. | |
| 5,678,046 A | 10/1997 | Cahill et al. | |

(Continued)

OTHER PUBLICATIONS

Method and Apparatus for Facilitating Online Payment Transactions in a Network-Based Transaction Facility Using Multiple Payment Instruments, Ebay Inc, Hamilton Avenue, San Jose, CA 95125, US, Mar. 17, 2000.*

(Continued)

*Primary Examiner*—Mary Cheung
*Assistant Examiner*—Tien C Nguyen
(74) *Attorney, Agent, or Firm*—Charles Hanor; Eric Cernyar

(57) ABSTRACT

A system and method is provided for processing, indexing, packaging, and delivering financial statements and the corresponding transaction document images to customers on a periodic basis. A cooperating system is provided for the customer to efficiently search and access those images from the customer's workstation.

25 Claims, 12 Drawing Sheets

U.S. PATENT DOCUMENTS

| | | | |
|---|---|---|---|
| 5,687,367 | A | 11/1997 | Dockter et al. |
| 5,706,472 | A | 1/1998 | Ruff et al. |
| 5,706,502 | A | 1/1998 | Foley et al. |
| 5,713,013 | A | 1/1998 | Black |
| 5,717,913 | A | 2/1998 | Driscoll |
| 5,721,908 | A | 2/1998 | Lagarde et al. |
| 5,742,816 | A | 4/1998 | Barr et al. |
| 5,752,242 | A | 5/1998 | Havens |
| 5,752,244 | A | 5/1998 | Rose et al. |
| 5,754,840 | A | 5/1998 | Rivette et al. |
| 5,774,123 | A | 6/1998 | Matson |
| 5,797,619 | A | 8/1998 | Bauer et al. |
| 5,822,539 | A | 10/1998 | van Hoff |
| 5,832,494 | A | 11/1998 | Egger et al. |
| 5,832,495 | A | 11/1998 | Gustman |
| 5,832,499 | A | 11/1998 | Gustman |
| 5,842,206 | A | 11/1998 | Sotomayor |
| 5,852,820 | A | 12/1998 | Burrows |
| 5,857,203 | A | 1/1999 | Kauffman et al. |
| 5,870,725 | A * | 2/1999 | Bellinger et al. .............. 705/45 |
| 5,875,441 | A | 2/1999 | Nakatsuyama |
| 5,889,958 | A | 3/1999 | Willens |
| 5,890,172 | A | 3/1999 | Borman et al. |
| 5,895,461 | A | 4/1999 | De La Heurga et al. |
| 5,899,999 | A | 5/1999 | De Bonet |
| 5,903,881 | A * | 5/1999 | Schrader et al. ............... 705/42 |
| 5,917,965 | A | 6/1999 | Cahill et al. |
| 5,920,859 | A | 7/1999 | Li |
| 5,924,090 | A | 7/1999 | Krellenstein |
| 5,940,844 | A | 8/1999 | Cahill et al. |
| 5,956,745 | A | 9/1999 | Bradford et al. |
| 5,961,602 | A | 10/1999 | Thompson et al. |
| 5,963,659 | A | 10/1999 | Cahill et al. |
| 5,987,454 | A | 11/1999 | Hobbs |
| 6,012,053 | A | 1/2000 | Pant et al. |
| 6,038,668 | A | 3/2000 | Chipman et al. |
| 6,092,074 | A | 7/2000 | Rodkin et al. |
| 6,092,080 | A | 7/2000 | Gustman |
| 6,098,064 | A | 8/2000 | Pirolli et al. |
| 6,101,492 | A | 8/2000 | Jacquemin et al. |
| 6,105,044 | A | 8/2000 | DeRose et al. |
| 6,112,203 | A | 8/2000 | Bharat et al. |
| 6,122,647 | A | 9/2000 | Horowitz et al. |
| 6,134,584 | A | 10/2000 | Chang et al. |
| 6,138,113 | A | 10/2000 | Dean et al. |
| 6,163,779 | A | 12/2000 | Mantha et al. |
| 6,181,837 | B1 * | 1/2001 | Cahill et al. ................ 382/305 |
| 6,199,060 | B1 | 3/2001 | Gustman |
| 6,212,527 | B1 | 4/2001 | Gustman |
| 6,247,018 | B1 | 6/2001 | Rheaume |
| 6,272,534 | B1 | 8/2001 | Guha |
| 6,275,820 | B1 | 8/2001 | Navin-Chandra et al. |
| 6,292,795 | B1 | 9/2001 | Peters et al. |
| 6,292,894 | B1 | 9/2001 | Chipman et al. |
| 6,374,266 | B1 | 4/2002 | Shnelvar |
| 6,449,627 | B1 | 9/2002 | Baer et al. |
| 6,453,383 | B1 | 9/2002 | Stoddard et al. |
| 6,507,363 | B1 | 1/2003 | Anderson et al. |
| 6,574,377 | B1 | 6/2003 | Cahill et al. |
| 6,721,783 | B1 * | 4/2004 | Blossman et al. ........... 709/206 |
| 6,834,276 | B1 | 12/2004 | Jensen et al. |
| 6,856,348 | B1 | 2/2005 | Okada |
| 7,403,916 | B1 * | 7/2008 | Brownell et al. .............. 705/33 |
| 7,421,153 | B1 * | 9/2008 | Ronca et al. ................ 382/305 |
| 2001/0018739 | A1 | 8/2001 | Anderson et al. |
| 2001/0056387 | A1 * | 12/2001 | Magary et al. ................ 705/30 |
| 2002/0152164 | A1 | 10/2002 | Dutta et al. |
| 2003/0208421 | A1 * | 11/2003 | Vicknair et al. ............... 705/35 |
| 2003/0225663 | A1 * | 12/2003 | Horan et al. .................. 705/36 |
| 2004/0162778 | A1 * | 8/2004 | Kramer et al. ................ 705/40 |
| 2004/0243494 | A1 | 12/2004 | Jenson |
| 2004/0243536 | A1 | 12/2004 | Jenson et al. |
| 2004/0243627 | A1 | 12/2004 | Jenson |
| 2004/0260636 | A1 | 12/2004 | Marceau |
| 2005/0015338 | A1 * | 1/2005 | Lee ............................. 705/40 |
| 2005/0027702 | A1 | 2/2005 | Jenson |
| 2005/0203885 | A1 * | 9/2005 | Chenevich et al. ............. 707/3 |
| 2005/0222989 | A1 * | 10/2005 | Haveliwala et al. ............ 707/3 |
| 2007/0086643 | A1 * | 4/2007 | Spier et al. .................. 382/137 |
| 2007/0088671 | A1 * | 4/2007 | McElroy et al. ................ 707/1 |
| 2007/0100749 | A1 * | 5/2007 | Bachu et al. .................. 705/42 |
| 2007/0288382 | A1 * | 12/2007 | Narayanan et al. ............ 705/45 |
| 2009/0138386 | A1 * | 5/2009 | Wilson et al. ................. 705/30 |

OTHER PUBLICATIONS

CD-ROM provides banks with inexpensive electronic access, records distribution, Gumaer, Mike, Bank News, v95, n6, p. 12-13, Jun. 1995.*

Rus D. and Subramanian, D., "Information Retrieval, Information Structure, and Information Agents", 1997, pp. 145-182; Lecture Notes in Computer Science, Springer-Verlag.

Wang, W. and Rada, R., Experiences with Semantic net Based Hypermedia:, International Journal of Human-Computer Studies, Sep. 1995, pp. 419-439, vol. 43, No. 3, Academic Press, Inc., USA.

Ellis, D. et al, "On the Measurement of Inter-Linker Consistency and Retrieval Effectiveness in Hypertext Databases", Proceedings of the 17th Annual International ACM-SIGIR Conference on Research and Development in Information Retrieval, Aug. 1994, pp. 51-60.

Lakshmanan, L.V.S., Sadri, F., and Subramanian, I.N., "A Declarative Language for Querying and Restructuring the Web", Research Issues in Data Engineering, Feb. 26-27, 1996, pp. 12-21.

Voigt, K., "Skipper: A Tool that Lets Browsers Adapt to Changes in Document Relevance to Its User", ride, 1996, p. 61, 6th International Workshop on Research Issues in Data Engineering (Ride '96) Interoperability of Nontraditional Database Systems.

Genesereth, M.R., Keller, A.M, and Duschka, O.M., "Informaster: An Information Integration System", International Conference on Management of Data, 1997, pp. 539-542, Tucson, AZ.

Ashish, N. and Knoblock, C.A., "Wrapper Generation for Semi-Structured Internet Sources", ACM SIGMOD Record, Dec. 1997, pp. 8-15, vol. 26 No. 4, ACM, New York, NY, USA.

Atzeni, P., Mecca, G. and Merialdo, P., "Semistructured and Structured Data in the Web: Going Back and Forth", ACM SIGMOD Record, Dec. 1997, pp. 16-23, vol. 26 No. 4, ACM, New York, NY, USA.

McHugh, J. and Widom, J., "Integrating Dynamically-Fetched External Information Into a DBMS for Semistructured Data", ACM SIGMOD Record, Dec. 1997, pp. 24-31, vol. 26 No. 4, ACM, New York, NY, USA.

* cited by examiner

FIG. 4

FINANCIAL STATEMENT AND TRANSACTION IMAGE DELIVERY AND ACCESS SYSTEM

FIELD OF THE INVENTION

The invention relates generally to systems for delivering financial information, and more particularly, to systems for delivering and accessing financial statements and processed financial transaction documents.

BACKGROUND OF THE INVENTION

In recent years, the use of online banking by commercial and retail customers has increased significantly. Online banking has been found to be much more desirable and efficient than traditional banking. Increasing emphasis is being directed to the use of electronic bank statements, checks, deposit slips and other documents, rather than the paper documents themselves. The use of these images can significantly reduce the expense, need and demand for the use of hard copy documents by customers.

There is, however, an element that is missing in the process. Customers who still use paper transactions along with their online banking are not able to effectively integrate those paper documents with their automated systems. Bank customers do not have the ability to keep imaged copies of bank statements, checks, deposit slips and other documents, on their own computers.

There are three common methods of making banking documents available to customers. First, the customer can receive the physical documents, checks, deposit slips, and other documents. The documents are then filed and are available for manual retrieval for viewing and copying. Customers may also scan the individual documents for placement in computer folders.

This method has many disadvantages. The bank must retain and mail the documents to the customer. This is a costly and inefficient process. The customer must physically store those documents, requiring the labor to do so and the space to accomplish this. Retrieval must be done manually, which is a tedious and costly process. Individual copies or scans must manually be made of the required documents. The documents must be returned to the file and properly archived. This is a very costly process due to associated labor, storage and operational inefficiencies.

An alternative to this system is sending copies of the documents, minimized in sheets, rather than sending the actual documents to the customer. From the customer standpoint, this system has the same drawbacks of maintaining the original documents. In addition, however, making copies for use by the customer is more difficult because of the decreased size and legibility of the copies of the document originals.

A second method involves banks providing CDs of the imaged documents for their customers. Single CDs are created for each customer and mailed. Customers must load the CD and viewer software onto their computers and register each CD before searching. Then customers must search each CD in order to view and use the images. Generally, each CD contains a maximum of one month of data. Therefore, databases must be searched individually and cross database searching is not possible.

The CD system is very cumbersome for the bank. Single CDs must be made for each customer. The CDs must be physically delivered to the customer by mail or courier. The system is generally only viable for large commercial customers making this type of image delivery unavailable for the majority of customers.

From the customer's standpoint, the information is not immediately available due to processing and mail time. Large customers may need the information as close to real time as possible in order to properly manage cash and lockbox situations. The CD system does not allow for this timely delivery.

Also, the use of CDs is inefficient. Even when the information from numerous CDs is loaded on the customer's computer, there is no ability to search across all information. The database on each CD represents only one month of bank images and must be searched individually.

The third method is to provide customers with online access to the images of their documents. In order to access the account information online, customers must log on to the bank Web site and enter the secure section. Then they can search, view and print out the documents individually. This system also has significant drawbacks.

If the server is unavailable, or customers do not have online access at the time the information is needed, online banking can be very frustrating. Since images must be accessed individually, there is no easy way to compile the imaged documents for a particular purpose. For example, it is difficult, if not impossible for a customer to create folders of vendor or supplier specific images. Customers, likewise, cannot feasibly create a folder of images for a given day or month. Even if the time were taken to manually organize all the desired images, the data could not be searched.

On the bank's side, customer information must be retained in the bank's online server for a significant period of time. Retrieval of specific information for a customer query after the information is removed from the online server is a costly process for the bank and the customer. The research process to find needed transactions not located on the banks server is very inefficient. The search process is time consuming, tedious and almost cost prohibitive for the bank and its customers.

A modification of this method is to allow customers online access to or download ability of PDF files of their documents. This has many drawbacks for the customer. The information is not indexed so even basic searches are difficult and cumbersome. Additionally, making copies of individual documents is generally impossible for most customers.

With the methods used currently, there is no effective way to allow customers to become paperless with regards to bank data. Previously, this technology has been unavailable.

SUMMARY OF THE INVENTION

The present invention gives financial institutions, such as banks, the ability to provide paperless banking to their customers. Although the technological implementation of the invention is complex, the process of using the invention is made very simple for the customer. A customer-level software application is made available to customers on the bank's Web site for download. Customers can then install the software on their own computers.

When images are produced or received by the bank, those images are extracted from the image server, indexed by an indexer, and made available for download. An email is generated and sent to customers informing them that their bank statements, check, deposit slip and other images are available electronically from the bank.

Customers then log on to the bank's secure Web site and download a file containing their banking images. The provided software application then opens with the downloaded file expanded for immediate use and available for viewing and searching.

Using the provided software application, customers can efficiently review their documents. The imaged documents are high quality digital images making them acceptable as proof of payment and are identical to the hard copy original documents. The downloaded financial transaction document images are automatically organized in folders according to the time period provided. Customers can search one or all folders of the imaged documents on their computers and retrieve all desired images. With the provided software application, customers can print, email and manage a single document or an entire folder of documents.

Another version of the present invention for large commercial customers is also very simple. Software can be downloaded directly onto computers or servers at the customers' locations, or downloads can be managed by a network administrator.

Images can be indexed as they are produced, and the download can be accomplished automatically on the Internet or by sending a secure FTP download. It is also possible to send the images to the customer and have the indexing completed at the customer's location.

With the provided software application, customers can review their documents very quickly. Each imaged document appears exactly as the hard copies of those documents. Customers can also create custom folders to organize their documents. They can search that folder along with all folders of document images on their computers and retrieve desired images. They can print, email and manage a single document or an entire folder of documents.

For very large commercial customers, the benefits are extremely important from a cash management standpoint. Information can be provided to customers daily, if required, within a short time after the images are generated or received. The folder can be immediately sent to the customer electronically. The images are then available for the customer to identify relevant information about transactions based on the data contained in the image. The images can also be used to reconcile accounts receivable, accounts payable, lock boxes and other financial management elements.

Images can also be used for customer support purposes. The images can be quickly searched to locate information for customer or supplier inquiries. The images can then easily be emailed or copied and mailed or faxed to the inquiring party.

For customers, the benefits of going paperless are clear. They have a single location of imaged banking data and a simple interface for accessing the data. The present invention provide customers with immediate access to their information, better organization and control, and a cleaner and more accurate audit process.

BRIEF DESCRIPTION OF THE DRAWINGS

FIG. 4 is a screenshot illustrating the computer screen layout of one embodiment of a customer application for searching and viewing financial statements and check images.

DETAILED DESCRIPTION

Figure 1:
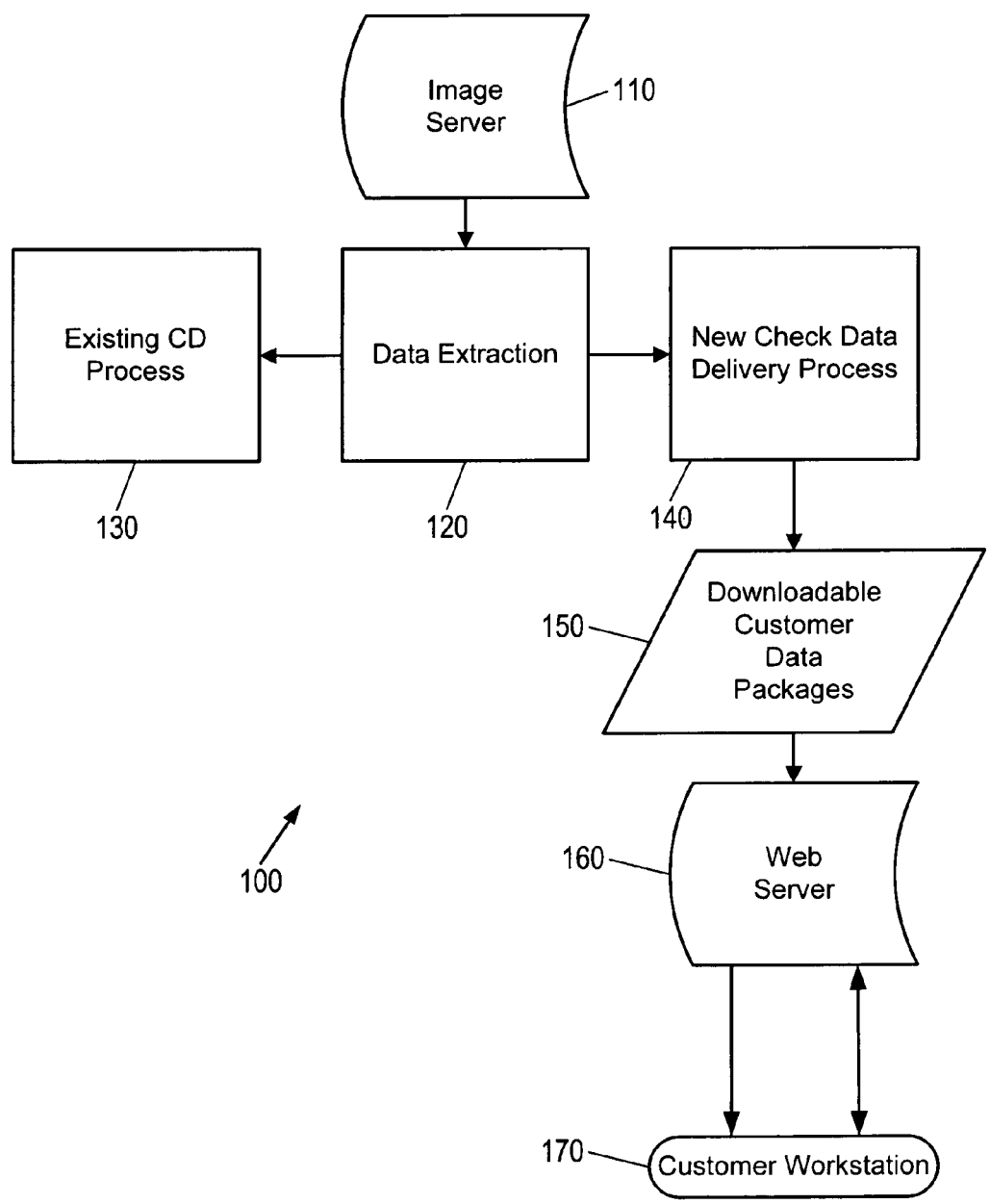
FIG. 1 is a flow chart illustrating one embodiment of a check and statement delivery system integrated into an existing CD-based check image delivery system.

FIG. 1 illustrates one embodiment of a financial transaction image and statement delivery system 100 integrated into an existing CD-based check image delivery system. A data extraction process 120 is used to extract stored data from an image server 110 into both a pre-existing CD-based check data delivery process 130 and into a new, downloadable archive-based statement and transaction image delivery process 140. The new statement and transaction image delivery process 140 places downloadable customer data packages 150 on a web server 160. Customers then download these customer data packages 150 to their workstations 170.

Figure 2:
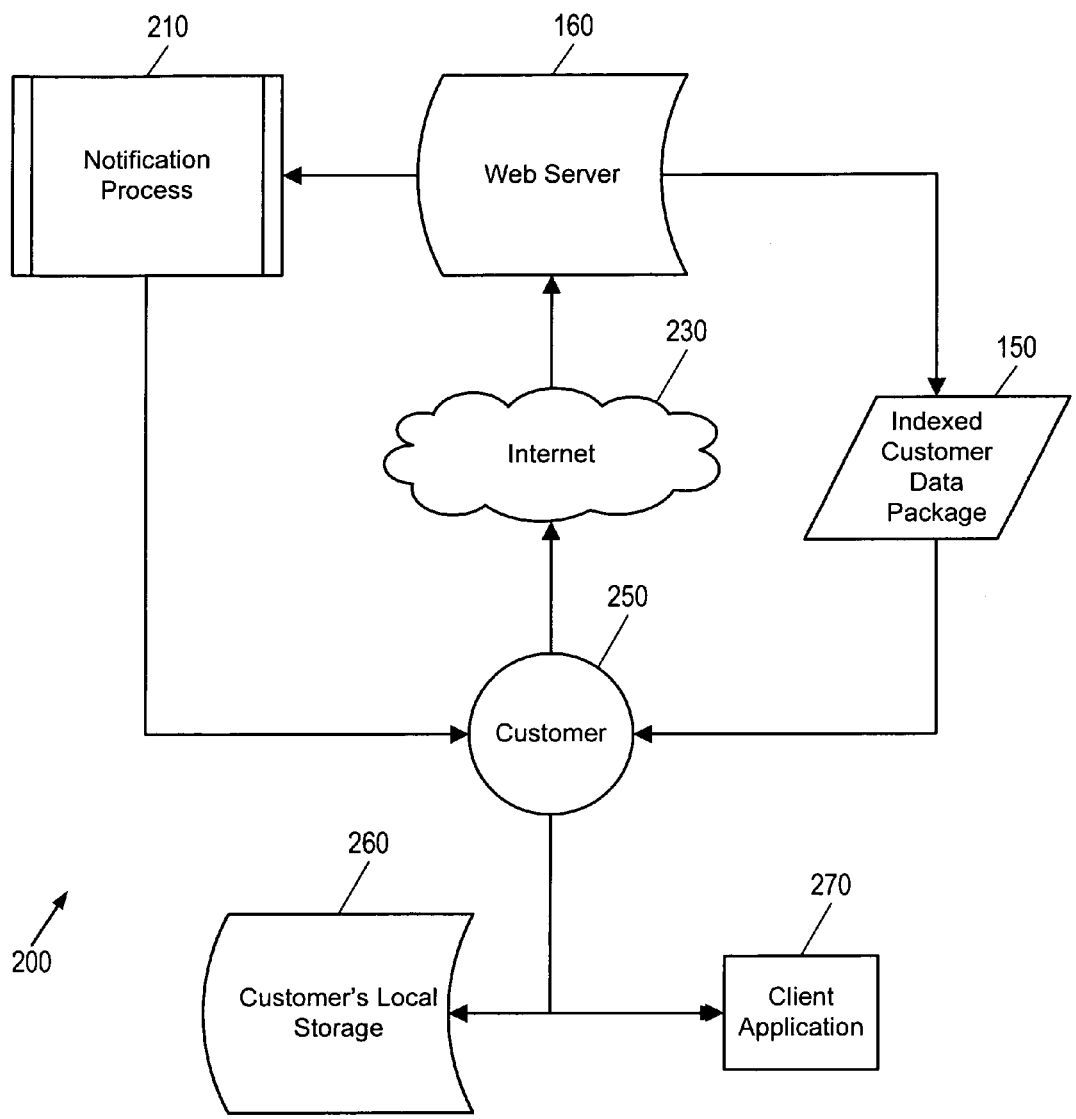
FIG. 2 is a flow chart illustrating one embodiment of a customer notification process for a check and statement delivery system.

FIG. 2 illustrates one embodiment of a customer notification process 200 for the financial transaction image and statement delivery system 100 of FIG. 1. In step 210, a customer 250 is notified, for example via an e-mail, of the availability of a downloadable indexed customer data package 150. The customer 250 then connects through the internet 230 to the web server 160 where the data package 150 is stored, and downloads the data package 150 to the customer's local storage 260. The customer has a client application 270 that is operable to open up the data package 150, extract and store the contents locally, and make the contents and the index available for viewing and searching within the client application 270.

Figure 4:
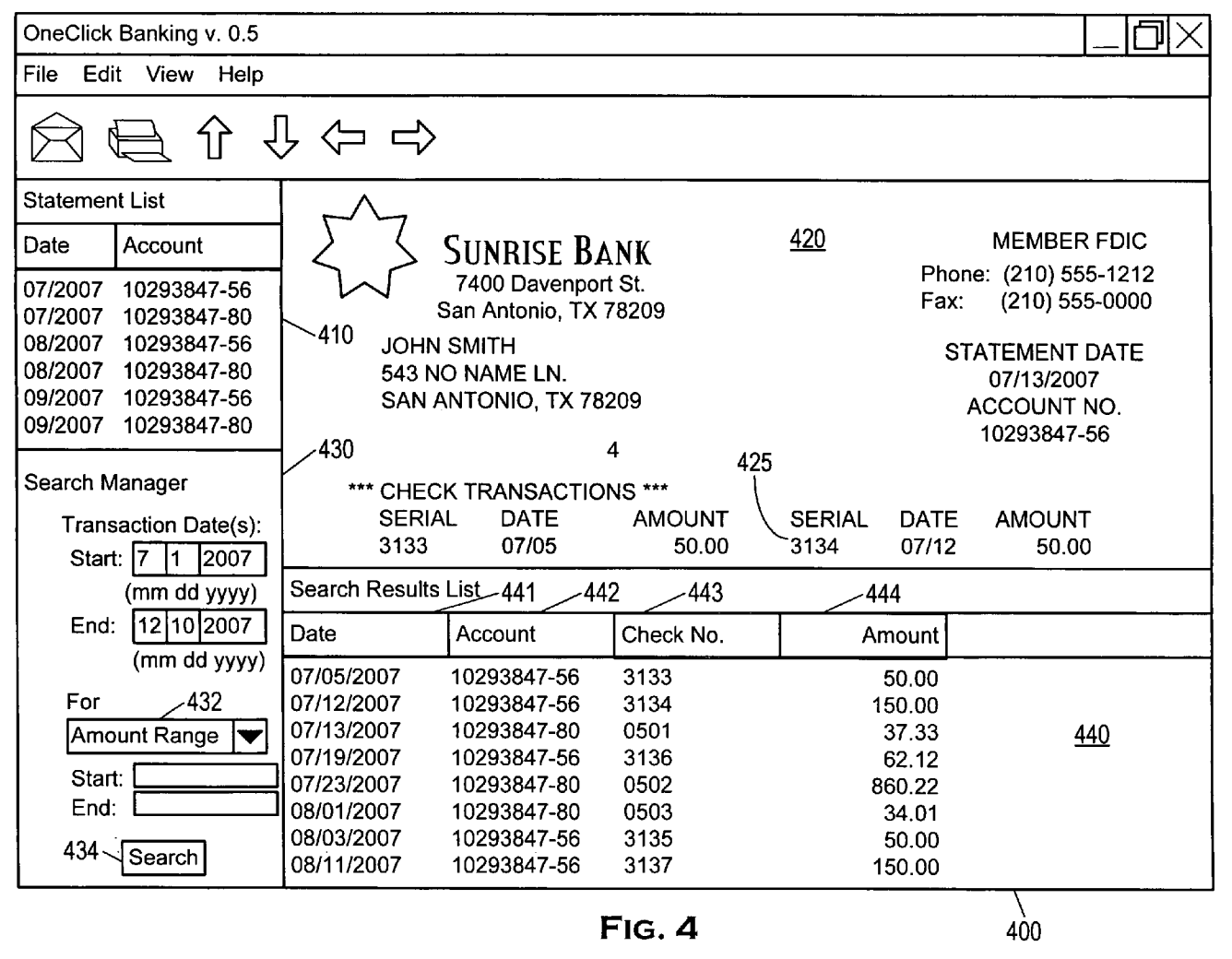

FIG. 4 is a screenshot 400 illustrating the screen layout of one embodiment of a client application 270 for searching and viewing financial statements and transaction images. The client application 270 lists a plurality of selectable hypertext-formatted transaction statements in a first window area 410 in the upper left region of the layout. Each of the listed transaction statements is associated with a searchable index of the processed financial transactions listed within the statement. The client application 270 can load multiple transaction statements simultaneously and search across multiple transaction statement indexes simultaneously. Selected statements or selected checks, deposit slips, debit notes, or other imaged financial transaction documents are displayed in a second window area 420.

When a financial transaction statement is displayed in the second window area 420, any checks listed in the second window area 420 are hypertext linked so that they can be selected. Upon selection of one of the check numbers 425, the corresponding cancelled check image is displayed in the second window area 420.

Below the first window area 410, a search manager 430 is provided that allows a customer to select or input a range of transaction dates with which to confine a financial transaction image search. The search manager 430 also provides a drop-down list 432 that allows the customer to search for either "all" the financial transaction images within the selected transaction date range, only those financial transaction images that match an input "amount," only those financial transaction images that match an input "amount range," only those financial transaction images that match an input "check number," or only those financial transaction images that match an input "check number range." Other embodiments of the search manager 430 may provide other searchable fields, such as check date (as opposed to the cleared transaction date) or recipient name.

After the customer enters the search criteria and selects the "Search" button 434, the financial transaction images matching the search criteria are displayed in a third window area 440 directly below the second window area 420. The search results are listed under various fields, such as date 441, account number 442, check number 443, and amount 444. Selection of any of these fields causes the search results to be sorted, in ascending or descending order, by the selected field.

Figure 3:
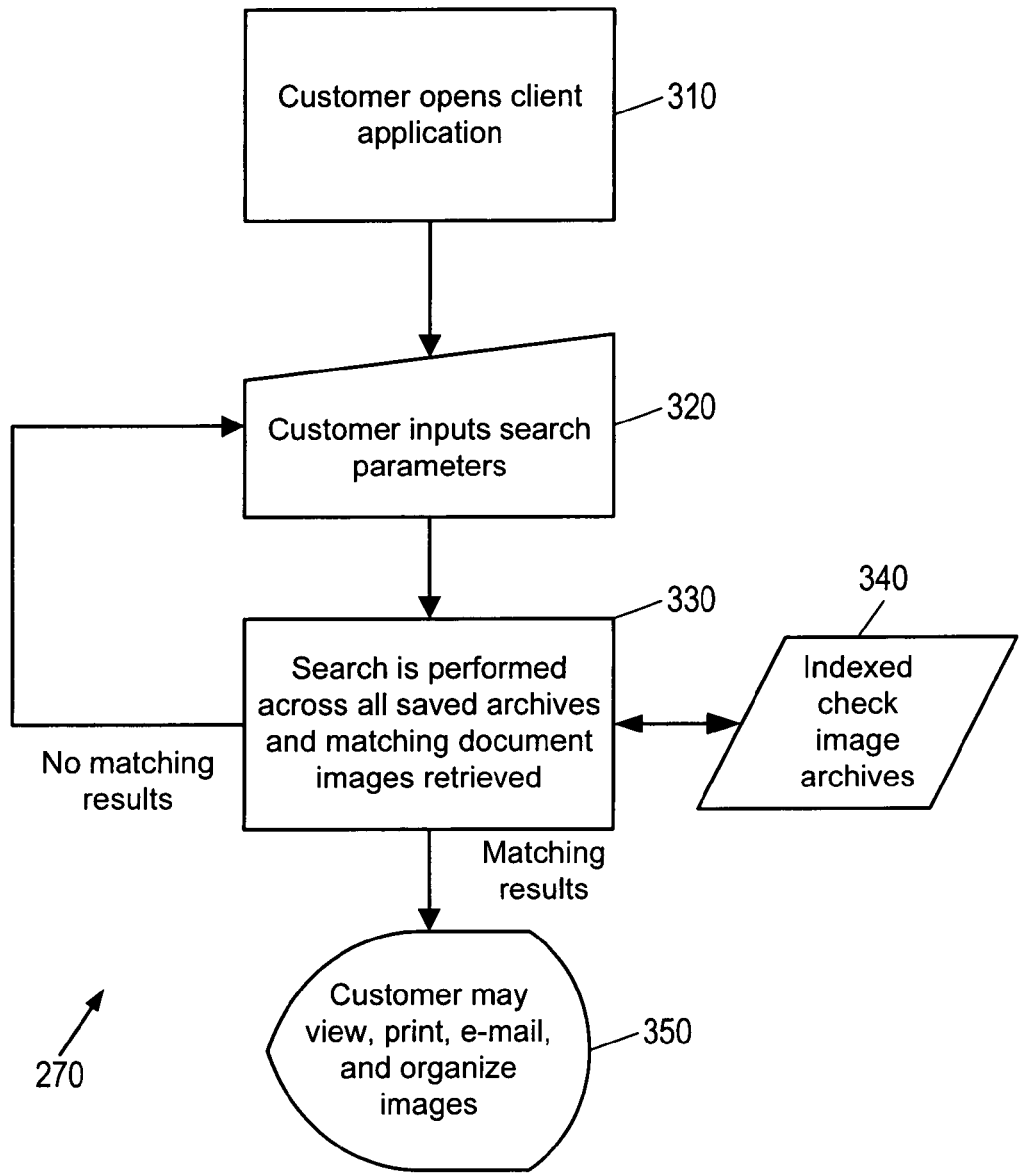
FIG. 3 is a flow chart illustrating one embodiment of a customer application for searching and viewing financial statements and check images.

FIG. 3 illustrates the searching capabilities of the client application 270 for searching and viewing financial statements and check images. In step 310, the customer opens the client application 310 simply by clicking on the downloaded indexed customer data package 150. In step 320, the customer inputs search parameters—e.g., a transaction date or date range, a check amount or check amount range, and/or a check number or check number range—into the search manager 430. In step 330, the search is performed across all the saved indexed financial transaction image archives 340 and the matching images are retrieved. In step 350, the customer may select any of the search results and thereby view the corresponding financial transaction image in the second window area 420, and view, print, and e-mail the images. The customer can also create folders—for example of tax-significant transactions—and drag and drop selected images into those folders.

Figure 5:
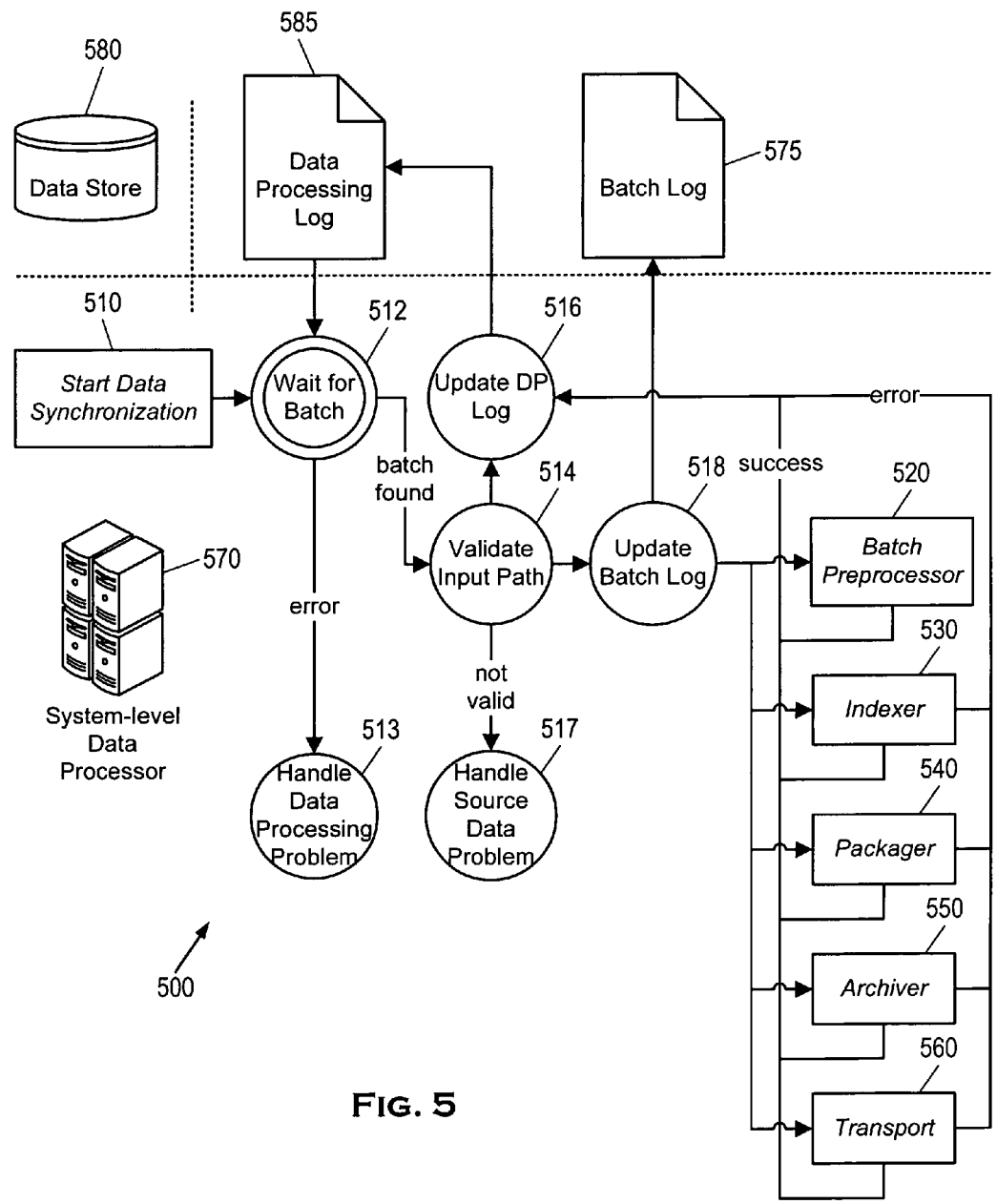
FIG. 5 is a flow chart illustrating one embodiment of a system and method for generating, indexing, and delivering financial statements and check images to a customer.

FIG. 5 is a flow chart illustrating one embodiment of a financial statement and document delivery and access system 500. The system comprises a system-level data processor 570 serving one or more financial institutions to provide statements and processed financial transaction document images to their customers. The system-level data processor 570 is in communication with a data store 580 for the serviced financial institution.

The system-level data processor 570 runs one or more software programs that are operable to retrieve a composite statement batch file of monthly (or quarterly or other periodic) transaction statements for a group of customers or accounts for which statements are routinely prepared on a given day of the month (or quarter or year or other period); convert the composite statement batch file into hypertext-formatted transaction statements for each customer or account for that period; retrieve a composite financial transaction document image archive that contains cancelled check images (and images of other processed financial transaction documents such as deposit slips) corresponding to the transactions listed in the transaction statements in the composite statement batch file; convert the composite financial transaction document image archive into individual image files for each processed transaction; identify the individual image files that correspond to each hypertext-formatted transaction statement; store each hypertext-formatted transaction statement and its corresponding processed financial transaction images under a common parent directory; generate hypertext links between the transactions listed on the hypertext-formatted transaction statements and the corresponding processed financial transaction document images; for each hypertext-formatted transaction statement, generate a searchable index of the corresponding processed financial transaction document images; and generate an archive file containing the hypertext-formatted transaction statement, the corresponding transaction document images, and the searchable index.

Many financial institutions routinely generate monthly transaction statements for different batches of customers or customer accounts on different consistent days of the month. For example, a group of approximately 5% of a bank's customers' financial statements might be consistently generated and mailed out on the $1^{st}$ day of the month, a group of another 5% of a bank's customers' financial statements might be generated and mailed out on the $2^{nd}$ day of the month, and so on. (Frequently, Saturdays, Sundays, and holidays are omitted). The financial statement and document delivery and access system 500 is designed to interface with such an existing system.

Figure 6:
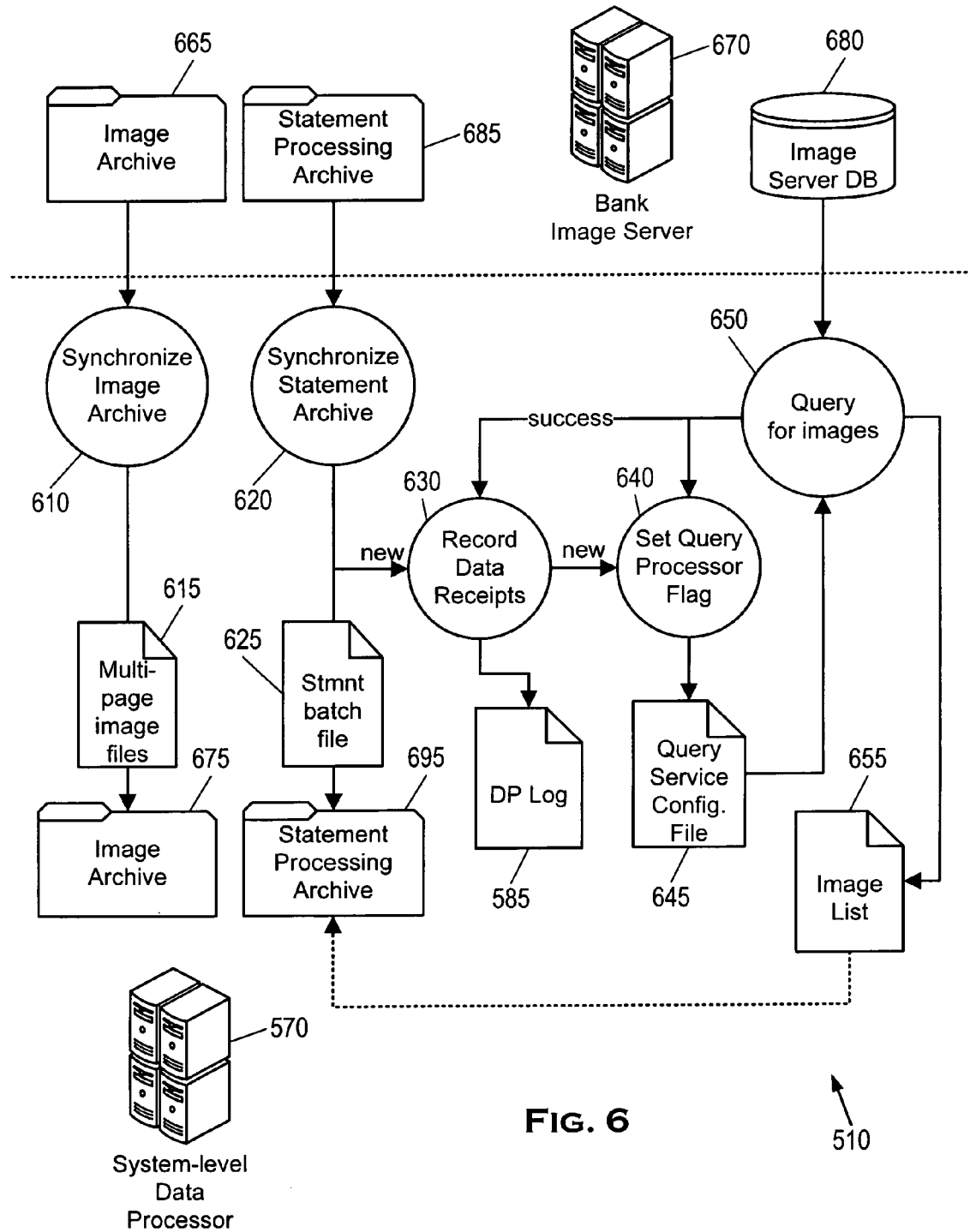
FIG. 6 is a flow chart illustrating the data synchronization process of the system and method of FIG. 5.

At regular intervals, the system-level data processor 570 runs a data synchronization process 510 to download batches of statements and images from the financial institution's image server. The data synchronization process is illustrated in FIG. 6 and explained further below. Step 512 illustrates the system-level data processor 570 waiting for a batch to be downloaded. If a data processing error is encountered while waiting for batch synchronization, in step 513, the system-level data processor 570 runs a process to handle the data processing problem. Once a batch is successfully downloaded, then the system-level data processor 570 runs a process 514 to validate the input path to the downloaded batch. If the input path is valid, then in step 516 the system-level data processor updates the data processing log 585 and in step 518 updates the batch log 575. If the input path is invalid, then in step 517, the system-level data processor 570 runs a process to handle the source data problem.

Figure 13:
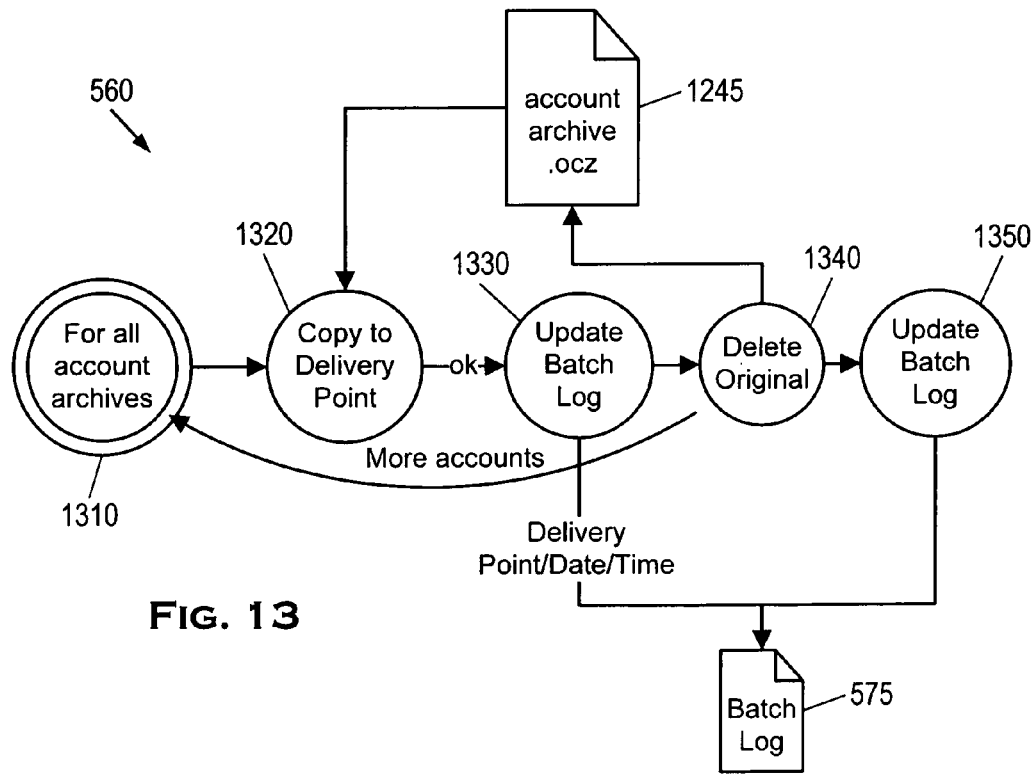
FIG. 13 is a flow chart illustrating the process of data transport process of the system and method of FIG. 5.

After completing step 518, the system-level data processor 570 runs the following sequence of processes: a process 520 to preprocess the batch (described further in connection with FIGS. 7-9); a process 530 to index the statements, check and other financial transaction images (described further in connection with FIG. 10); a process 540 to package each group of statements, check and other financial transaction images associated with a given customer or customer account (described further in connection with FIG. 11); a process 550 to archive the packages into a single downloadable file (described further in connection with FIG. 12), and a process 560 to deliver the archives to the customer (described further in connection with FIG. 13). As each of these processes 520-560 is completed, the system-level data processor 570 reports each success or error on the data processing log 585.

FIG. 6 illustrates the data synchronization process 510 of the system and method of FIG. 5. In step 610, the system-level data processor 570 synchronizes its own image archive 675 with the image archive 665 maintained on the pre-existing image server 670 serving the financial institution. As part of this synchronization process, one or more composite multi-page image files 615 (typically TIFF-formatted image files), typically comprising hundreds or thousands of check and other financial transaction images processed by the financial institution on a given day, are copied from the institution's image archive 665 to the system image archive 675.

In step 620, the system-level data processor 570 synchronizes its own statement processing archive 695 with the statement processing archive 685 maintained by or on behalf of the financial institution. As part of this synchronization process, a multi-statement batch file 625 is copied from the institution's statement processing archive 685 to the system statement processing archive 695. The batch file 625 is typically in the form of an ASCII text and ASCII-formatted file comprising hundreds or thousands of statements processed by the financial institution on a given day. Banks conventionally simply print this batch file 625 out onto bank letterhead and mail the statements to their customers. As explained further in connection with FIG. 8, the present invention uses this same batch file 625 to generate hypertext-formatted statements in which the font, font size, and spatial layout of the text is identical or nearly identical to the font, font size, and spatial layout of the text on the paper statements conventionally mailed to customers After a new statement batch file 625 is copied, in step 630, the system-level data processor 570 records the event in the data processing log 585. Then, in step 640, the system-level data processor 570 sets a query processor flag to "run" in a query service configuration file 645.

In one embodiment, a query is constructed that provides the image server database 680 with a statement date and asks the Image Server database 680 to return a text file 655 that lists every account number for which a statement has been created on that date, the transactions that took place during the statement period, the name and location of the multi-page image file(s) 615 containing check and other financial document images corresponding to those transactions, and the starting and ending bytes of the corresponding check and other financial transaction images in the composite multi-page image file(s) 615. In other embodiments, information from the composite statement batch file may be parsed to further populate the query service configuration file 645 with more specific information—for example, a particular account number or range of account numbers—with which to query the image server database 680.

In step 650, information from the query service configuration file 645 is used to query an image server database 680 hosted by the image server 670. The query returns an image list 655 identifying the account numbers, and for each account number the transactions that took place during the statement period, including the transaction posting date, the serial number. The image list also includes the name and location of the corresponding multi-page image file(s) 615 containing the corresponding check and other financial document images corresponding to the listed transactions, and the starting and ending bytes of the corresponding images in the composite multi-page image file(s) 615. The system-level data processor stores the image list 655 in the statement processing archive 695. The image list 655 is later used to derive check image files for each cancelled check from the composite multi-page image file(s) 615.

Figure 7:
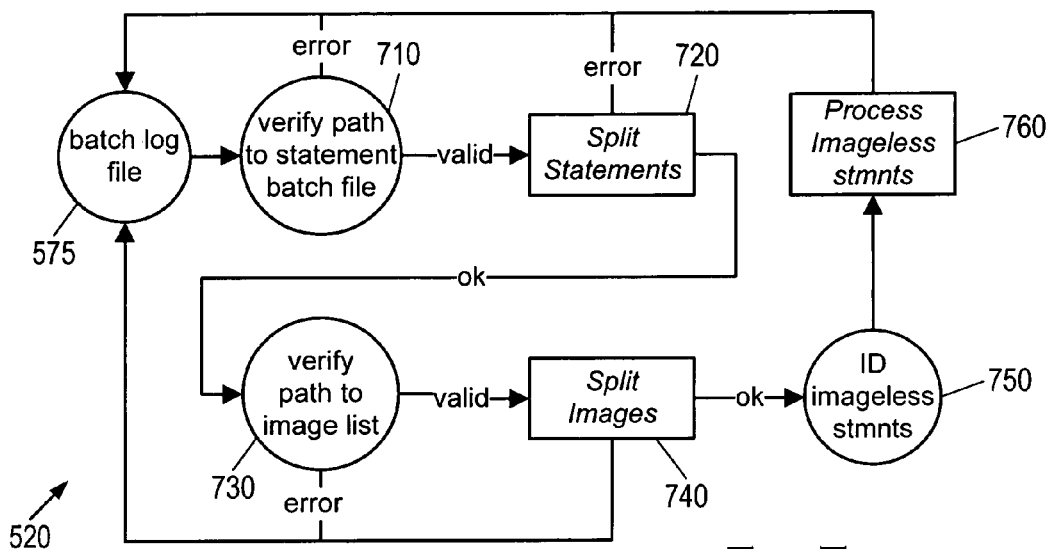
FIG. 7 is a flow chart illustrating the batch preprocessing process of the system and method of FIG. 5
Figure 8:
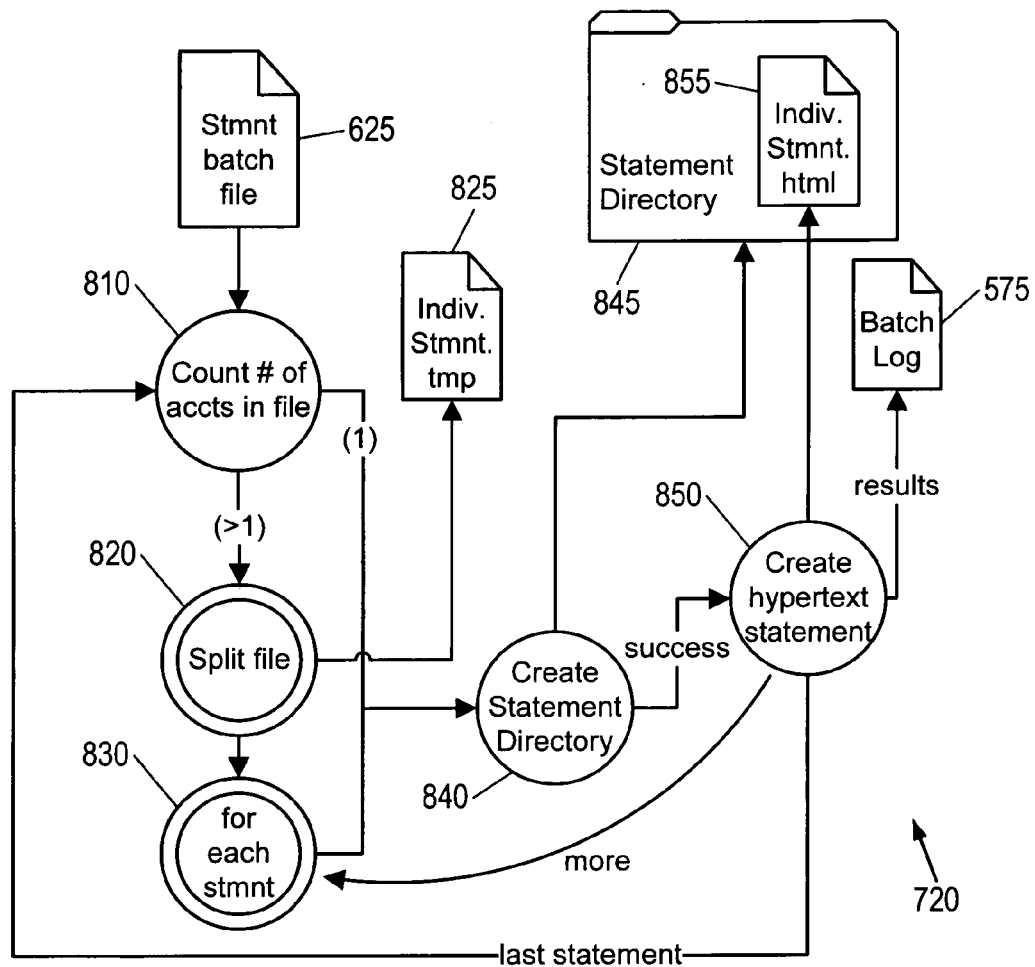
FIG. 8 is a flow chart illustrating the statement splitting process of FIG. 7.
Figure 9:
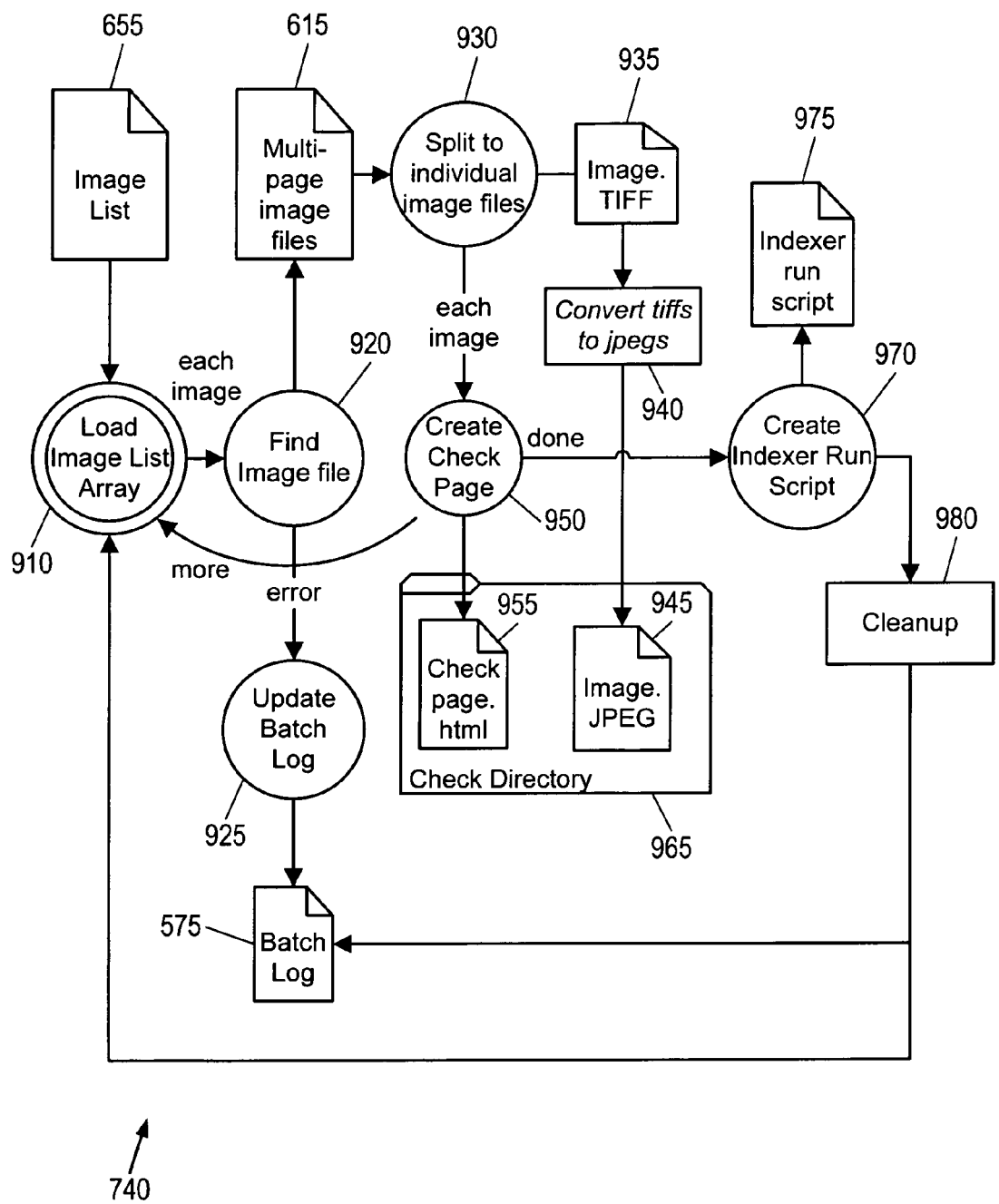
FIG. 9 is a flow chart illustrating the check image splitting process of FIG. 7.

FIG. 7 illustrates the batch preprocessing process 520 of the system and method of FIG. 5. The process begins by reviewing the batch log file 575, and in step 710, verifying the path to the multi-statement batch file 625. If the path is verified, then a process 720, further described in connection with FIG. 8, is executed to split the multi-statement batch file 625 into individual statements. If this process is successful, then in step 730, the path(s) to the multi-page image file(s) 615 is/are verified. If the paths are found to be valid, then a process 740, further described in connection with FIG. 9, is executed to split the multi-page image file(s) 615 into individual check, deposit slip/record, and debit record images. If this process is successful, then in step 750, statements for which there has been no account activity that would result in any transaction images are identified, and these statements are processed in step 760. If at any point in the batch preprocessing process 520 an error is encountered, the error is reported in the batch log file 575.

FIG. 8 illustrates the statement splitting process 720 of FIG. 7. In step 810, the data processor 570 evaluates the number of accounts in the statement batch file 625. If there is more than one account, then in step 820, the statement batch file 625 is split into temporary individual statement files 825. Then a loop process 830 is executed for each account statement 825, in which in step 840 a statement directory 845 is created and in step 850 a hypertext statement 855 is generated. The hypertext statement 855 is formatted to include the financial institution's letterhead and to look like mailed paper versions of statements customarily mailed out by the financial institution. The results of this process 830 are then documented in the batch log 575.

FIG. 9 illustrates the financial transaction image splitting process 740 of FIG. 7. The financial transaction image splitting process 740 includes a loop process 910 in which the data processor 570 loads the image list 655 into a memory array and a series of steps are executed for each transaction document image. For each image, in step 920 the corresponding multi-page TIFF-formatted image file 615 is located. When located, in step 925 the batch log 575 is updated, and in step 930, the located image file 615 is split into individual TIFF-formatted image files 935. In step 940, the individual TIFF-formatted image files 935 are converted into JPEG-formatted images 945. In step 950, an HTML-formatted check page 955 is created for, and linked to, each JPEG-formatted image 945. The HTML-formatted check page 955 and associated JPEG-formatted images 945 are stored under a common parent directory 965. After steps 920-950 are completed for each image in the image list array, then in step 970 an indexer run script 975 is created for use by the indexing process 530. The financial transaction image splitting process 740 concludes with a cleanup routine 980, during which temporary files, such as the individual TIFF image files 935, are deleted, and the batch log 575 is updated.

Figure 10:
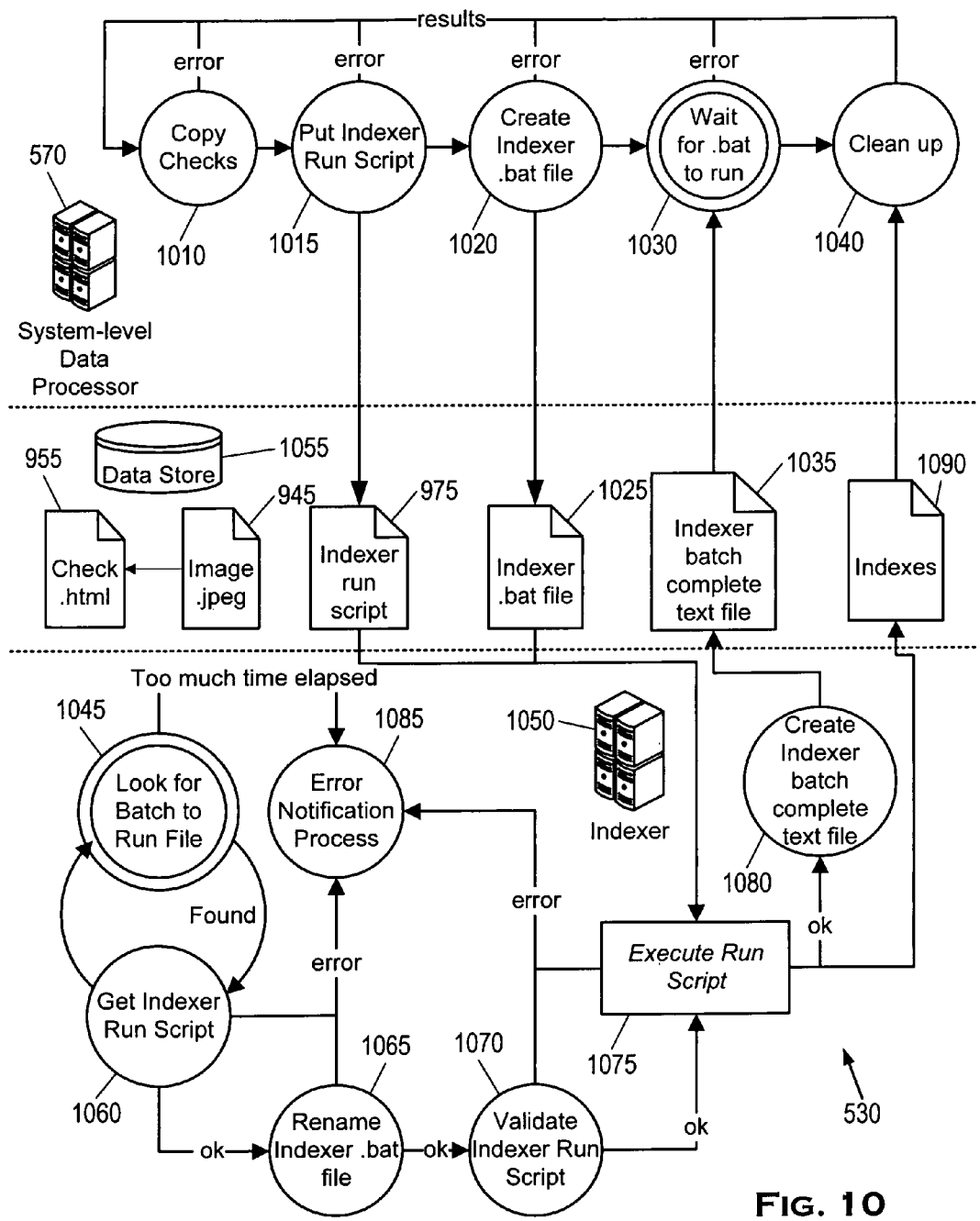
FIG. 10 is a flow chart illustrating the indexing process of the system and method of FIG. 5.

FIG. 10 illustrates the indexing process 530 of the system and method of FIG. 5. In an embodiment actually reduced to practice, the indexing functions are carried out by an indexer 1050 running on a fast and efficient Linux-based operating system, separate from the data processor 570, which runs a Windows-based operating system. To accommodate this setup, in step 1010, the html check pages 955 are copied from the storage associated with the data processor 570 to a data store 1055 accessible to both the data processor 570 and the indexer 1050. In step 1015, the indexer run script 975 is copied to the data store 1055. In step 1020, an indexer flag 1025 is set (or created). In one embodiment, the indexer flag 1025 is set by creating a simple file.

Meanwhile, in step 1045, the indexer 1050 looks for the indexer flag 1025, and when one is detected, in step 1060 it retrieves the indexer run script 975. In step 1065, the indexer 1050 resets the indexer flag 1025 (which in one embodiment involves simply renaming the file that acts as the flag). In step 1070, the indexer 1050 validates the indexer run script 975. In step 1075, the indexer 1050 executes the indexer run script 975 to generate indexes of the transaction dates, transaction amounts, and check numbers of the checks listed on the transaction statement. Once the indexing is complete, then in step 1080 the indexer generates the corresponding indexes 1090 and sets an indexer done flag 1035 (in one embodiment this is accomplished by creating a simple indexer done file). If any errors occur in steps 1060, 1065, 1070, or 1075, an error notification process 1085 is executed.

Turning back to the indexing process running on the data processor 570, in step 1030, the data processor 570 waits for an indexer done flag 1035 to be set (or created) and placed on the data store 1055 to indicate that the indexer 1050 has run. After the indexer done flag 1035 is read, the data processor 570 runs a cleanup process 1040, which moves the indexes 1090 to another location and deletes and/or moves various other files.

Figure 11:
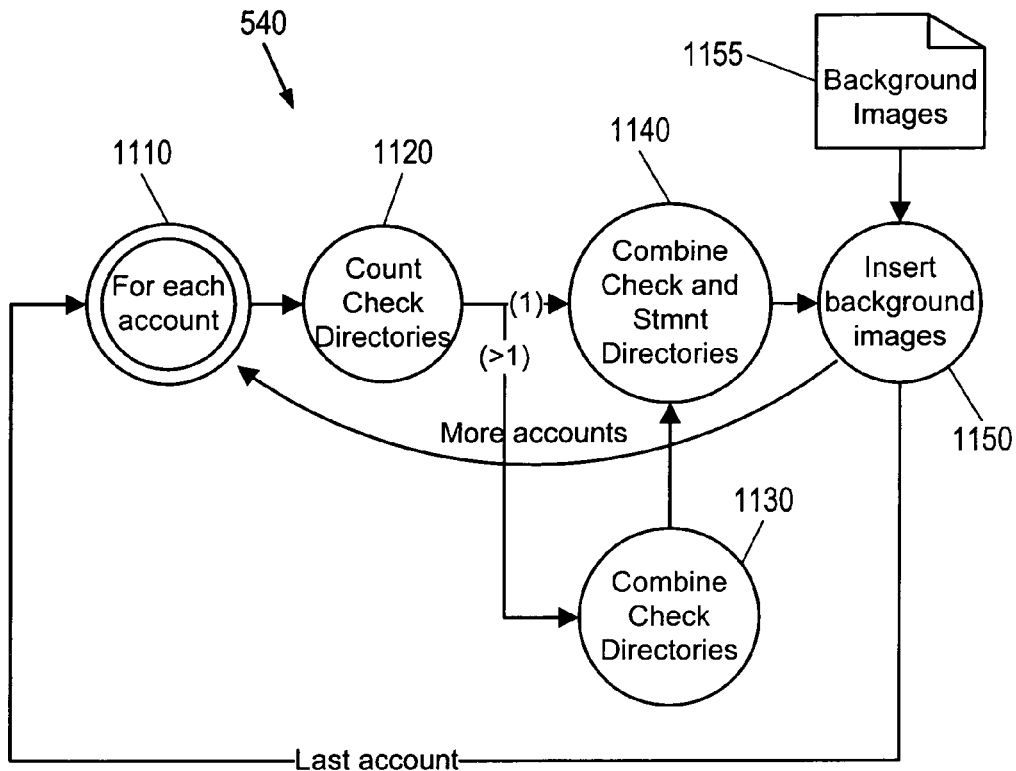
FIG. 11 is a flow chart illustrating the statement and check image packaging process of the system and method of FIG. 5.

FIG. 11 is a flow chart illustrating the statement and check image packaging process 540 of the system and method of FIG. 5. The packaging process 540 runs a loop 1110 in which a series of steps are executed for each account. In step 1120, the number of check directories is counted. If more than one is found, then in step 1130 the check directories are combined. In step 1140, the check and statement directories are combined. In step 1150, background images 1155 used to render the bank's letterhead are inserted in or linked to the statement pages 855. The background images 1155 are duplicated and placed in every statement directory 845 so that they will reside within each database, so that each viewed statement will look like a mailed statement.

Figure 12:
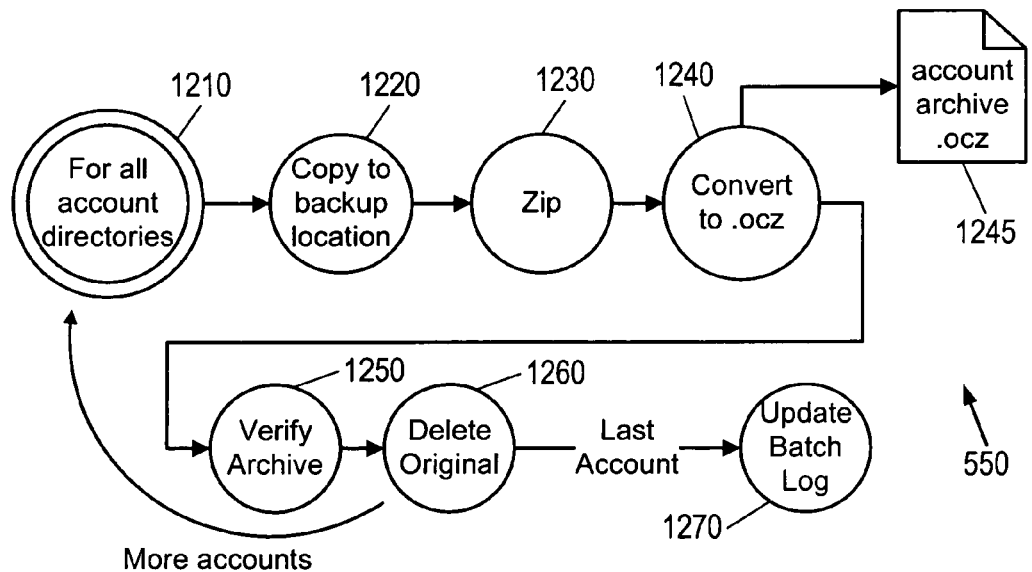
FIG. 12 is a flow chart illustrating the archive creating process of the system and method of FIG. 5.

FIG. 12 illustrates the archive creating process 550 of the system and method of FIG. 5. The archive creating process 550 runs a loop 1210 in which a series of steps are executed for each account directory. In step 1220, the contents of the account directory are copied to a backup location for disaster recovery. In step 1230, the contents of the account directory are zipped into a single archive file 1245. In step 1240, the archive file 1245 is provided with a consistent, application-specific file format extension. In the reduced-to-practice embodiment, the extension is ".ocz", and the installation program provided with the client-based application 270 causes the customer's computer to associate the ".ocz" file format extension with the client-based application 270, so that when the customer executes a command to open a ".ocz" file, the client-based application 270 automatically extracts the archive's contents, stores the contents locally, and makes the contents and index available for perusal within the client-based application program 270. In step 1250, the data processor 570 verifies the archive file 1245 before deleting the original account directory in step 1260. After steps 1220 through 1260 are repeated for each account directory, then in step 1270 the batch log is updated.

FIG. 13 illustrates the data transport process 560 of the system and method of FIG. 5. The data transport process 560 executes a loop process 1310 for all of the account archives. In step 1320, the account archive file 1245 is copied to the delivery point (i.e., the bank's disk storage allocated to the web delivery system for serving the archives). The data processor 570 updates the batch log 575 in step 1330 and deletes the original archive file 1245 in step 1340. After completing the loop process 1310 for all of the account archives, the data processor 570 once again updates the batch log 575.

Figure 14:
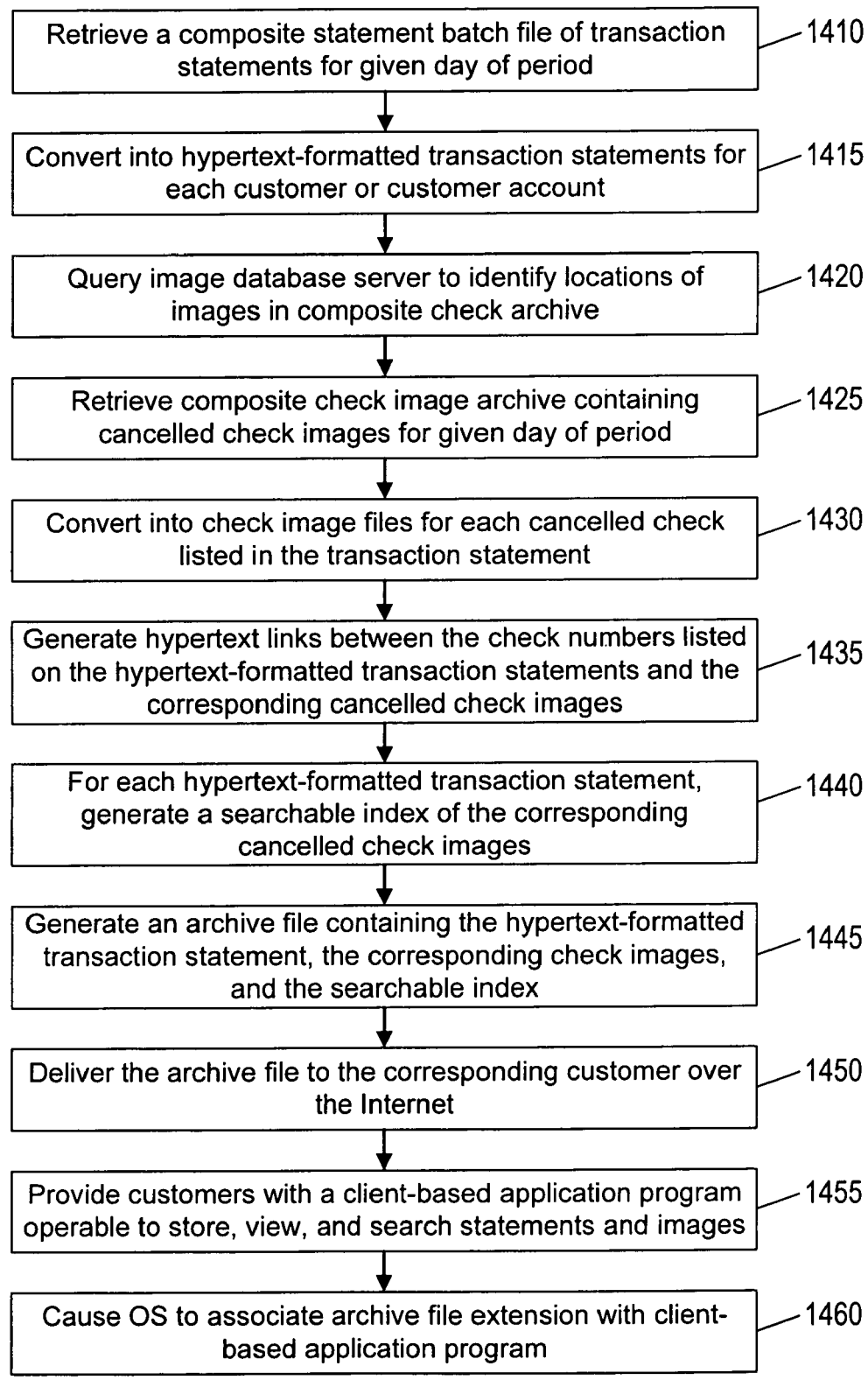
FIG. 14 is a functional flow diagram of one characterization of the check and system delivery method according to the present invention.

FIG. 14 is a functional flow diagram of one characterization of the check and system delivery method 1400 according to the present invention. In step 1410, retrieve a composite statement batch file of monthly (or quarterly or other period) transaction statements for a given day of the month (or quarter or other period). In step 1415, convert the composite statement batch file in to hypertext-formatted monthly (or quarterly or other period) transaction statements for each customer or customer account. In step 1420, query the image database server to identify locations of images in the composite processed financial document archive. In step 1425, retrieve the composite processed financial document image archive containing cancelled check images, deposit slips, and other processed financial transaction images for the given day of the month, quarter, or other period. In step 1430, convert the composite financial document image archive into individual image files for each transaction listed in the transaction statement. In step 1435, generate hypertext links between the transactions listed on the hypertext-formatted transaction statements and the corresponding processed financial transaction images. In step 1440, for each hypertext-formatted transaction statement, generating a searchable index of the corresponding processed financial document images. In step 1445, generate an archive file containing the hypertext-formatted monthly transaction statement, the corresponding processed financial document images, and the searchable index. In step 1450, deliver the archive file to the corresponding customer over the Internet. In step 1455, provide customers with a client-based application program for installation on their computers that is operable to open up the archive file, extract and store the contents locally, and make the contents and index available for viewing and searching within the client-based application program. In step 1460, cause the customer's operating system to associate the archive file extension with the client-based application program.

Persons of ordinary skill in the art, enlightened by the present specification and those incorporated by reference, will understand how to build a system or write software code capable of carrying out the inventive concepts disclosed herein.

Although the foregoing specific details describe a preferred embodiment of this invention, persons reasonably skilled in the art will recognize that various changes may be made in the details of the method and apparatus of this invention without departing from the spirit and scope of the invention as defined in the appended claims. Therefore, it should be understood that, unless otherwise specified, this invention is not to be limited to the specific details shown and described herein.

We claim:

1. A computer-implemented method of processing, indexing, packaging, and delivering imaged check information to customers of a financial institution, the method comprising:

computer generating hypertext-formatted periodic transaction statements for each customer or customer account;

computer generating check image files for each cleared check listed in the periodic transaction statement;

computer generating hypertext links between the check numbers listed on the hypertext-formatted periodic transaction statements and the corresponding cleared check images;

for each hypertext-formatted periodic transaction statement, computer generating a searchable index of the corresponding cleared check images, the searchable index pertaining specifically and exclusively to that customer or customer account;

computer generating an archive file containing the hypertext-formatted periodic transaction statement, the corresponding cleared check images, and the searchable index;

delivering the archive file to the corresponding customer over the Internet; and providing customers with a client-based application program for installation on their computers, the program being operable to open up the archive file, extract and store the contents locally, and make the contents and index available for viewing and searching within the client-based application program.

2. The method of claim 1, further comprising:
providing a consistent, application-specific file format extension to generated archive files; and
causing the customer's computer to associate the file format extension of the generated archive file with the client-based application program, so that when a customer executes a command to open a generated archive file, the client-based application program automatically extracts the archive's contents, stores the contents locally, and makes the contents and index available for perusal within the client-based application program.

3. The method of claim 1, wherein the client-based application program is operable to list a plurality of selectable hypertext-formatted periodic transaction statements in a first window area; display a selected statement in a second window area; and display search results in a third window area, wherein each of the first, second, and third window areas are non-overlapping and presented within a common window screen.

4. The method of claim 3, wherein the client-based application program is further operable, upon selection of a corresponding check number in a periodic statement displayed in the second window area, to display a check image in the second window area.

5. The method of claim 1, wherein the client-based application program is operable to access multiple periodic transaction statements simultaneously and to search across multiple transaction indexes simultaneously.

6. The method of claim 1, wherein the searchable index indexes the transaction dates, transaction amounts, and check numbers of the checks listed on the periodic transaction statement.

7. The method of claim 1, wherein the hypertext-formatted periodic transaction statement is formatted to include the financial institution's letterhead and to look like mailed paper versions of statements customarily mailed out by the financial institution.

8. The method of claim 1, as applied to financial institution that, on a monthly basis, and on any of a number of given days of a month, generates a composite statement batch file of monthly transaction statements for a group of customers or accounts for which statements are routinely prepared on that given day of the month, the method further comprising:
retrieving a composite statement batch file of monthly transaction statements for a group of customers or accounts for which periodic statements are routinely prepared on a given day of the month;
wherein hypertext-formatted monthly transaction statements for each customer or account are generated from the composite statement batch file.

9. The method of claim 8, further comprising:
retrieving a composite check image archive that contains cleared check images corresponding to the transaction statements in the composite statement batch file;
wherein the check image files generated for each cleared check are derived from the composite check image archive.

10. The method of claim 9, further comprising the step of:
querying an image database server containing images of cleared checks to generate a file identifying the locations of the images in the composite check image archive.

11. A computer-implemented method of processing, indexing, packaging, and delivering imaged check information to a customer of a financial institution that, on a monthly basis, and on any of a number of given days of a month, generates a statement batch file of monthly transaction statements for a group of customers or accounts for which statements are routinely prepared on that given day of the month, the method comprising:
retrieving through a computer a composite statement batch file of monthly transaction statements for a group of customers or accounts for which statements are routinely prepared on a given day of the month;
converting through a computer the composite statement batch file into hypertext-formatted monthly transaction statements for each customer or account;
retrieving through a computer a composite check image archive that contains cleared check images corresponding to the monthly transaction statements in the composite statement batch file;
converting through a computer the composite check image archive into check image files for each cleared check;
identifying through a computer the check image files that correspond to each hypertext-formatted monthly transaction statement;
computer generating hypertext links between the check numbers listed on the hypertext-formatted monthly transaction statements and the corresponding cleared check images;
for each hypertext-formatted monthly transaction statement, computer generating a searchable index of the corresponding cleared check images, the searchable index pertaining specifically and exclusively to that customer or customer account;
computer generating an archive file containing the hypertext-formatted monthly transaction statement, the corresponding cleared check images, and the searchable index;
delivering the archive file to the corresponding customer over the Internet; and
providing customers with a client-based application program operable to open up the archive file, extract and store the contents locally, and make the contents and index available for viewing and searching within the client-based application program.

12. The method of claim 11, further comprising:
providing a consistent, application-specific file format extension to generated archive files; and
causing the customer's computer to associate the file format extension of the generated archive file with the client-based application program, so that when a customer executes a command to open a generated archive file, the client-based application program automatically extracts the archive's contents, stores the contents locally, and makes the contents and index available for perusal within the client-based application program.

13. The method of claim 11, wherein the client-based application program is operable to list a plurality of selectable hypertext-formatted monthly transaction statements in a first window area; display a selected statement in a second window area; and display search results in a third window area, wherein each of the first, second, and third window areas are non-overlapping and presented within a common window screen.

14. The method of claim 13, wherein the client-based application program is further operable, upon selection of a corresponding check number in a statement displayed in the second window area, to display a check image in the second window area.

15. The method of claim 11, wherein the client-based application program is operable to access multiple monthly transaction statements simultaneously and to search across multiple monthly transaction indexes simultaneously.

16. The method of claim 11, wherein the searchable index indexes the transaction dates, transaction amounts, and check numbers of the checks listed on the transaction statement.

17. The method of claim 11, wherein the hypertext-formatted transaction statement is formatted to include the financial institution's letterhead and to look like mailed paper versions of statements customarily mailed out by the financial institution.

18. The method of claim 11, further comprising the step of:
querying an image database server containing images of cleared checks to generate a file identifying the locations of the images in the composite check image archive, and using that file to derive check image files for each cleared check from the composite check image archive.

19. The method of claim 18, wherein the first financial institution software module is operable to retrieve information from the composite statement batch file in order to generate the image query of the image database server.

20. The method of claim 11, wherein the composite check image archive contains images in a multi-TIFF image format, the method further comprising generating JPEG-formatted image files for each cleared check in the composite image archive.

21. A system for processing, indexing, packaging, and delivering imaged financial transaction information to customers of a financial institution that, on a periodic basis, and on any of a number of given days of a period, generates a statement batch file of transaction statements for a group of customers or accounts for which statements are routinely prepared on that given day of the period, the system comprising:

a system-level program on a computer-readable medium operable to:
retrieve a composite statement batch file of transaction statements for a group of customers or accounts for which statements are routinely prepared on a given day of the period;
convert the composite statement batch file into hypertext-formatted transaction statements for each customer or account;
retrieve a composite processed financial transaction document image archive that contains processed financial transaction document images corresponding to transactions listed in the transaction statements in the composite statement batch file;
convert the composite processed financial transaction document image archive into individual financial transaction document image files for each transaction;
identify the processed financial transaction document image files that correspond to each hypertext-formatted transaction statement;
group each hypertext-formatted transaction statement and its corresponding processed financial transaction document images together;
generate hypertext links between the transactions listed on the hypertext-formatted transaction statements and the corresponding processed financial transaction document images;
for each hypertext-formatted transaction statement, generate a searchable index of the corresponding processed financial transaction document images, the searchable index pertaining specifically and exclusively to that customer or customer account;
generate an archive file containing the hypertext-formatted transaction statement, the corresponding processed financial transaction document images, and the searchable index; and a customer-level program stored on a computer-readable medium that is operable to:
open up the archive file, extract and store the contents locally, and make the contents and index available for viewing and searching within the client-based application program.

22. The system of claim 21, wherein the customer-level program is operable to list a plurality of selectable hypertext-formatted transaction statements in a first window area; display a selected statement in a second window area; and display search results in a third window area, wherein each of the first, second, and third window areas are non-overlapping and presented within a common window screen.

23. The system of claim 22, wherein the customer-level program is further operable, upon selection of a corresponding check number in a statement displayed in the second window area, to display a check image in the second window area.

24. The system of claim 21, wherein the customer-level program is operable to access multiple transaction statements simultaneously and to search across multiple transaction indexes simultaneously.

25. The system of claim 21, wherein the hypertext-formatted transaction statement is formatted to include the financial institution's letterhead and to look like mailed paper versions of statements customarily mailed out by the financial institution.

* * * * *